March 18, 1958     H. A. SKOG     2,827,088
FRUIT PITTING MACHINE

Original Filed Dec. 14, 1950     13 Sheets—Sheet 1

INVENTOR.
HENRY A. SKOG
BY
MOORE, PRANGLEY & CLAYTON
ATTORNEYS

March 18, 1958 H. A. SKOG 2,827,088
FRUIT PITTING MACHINE
Original Filed Dec. 14, 1950 13 Sheets-Sheet 2

INVENTOR.
HENRY A. SKOG
BY
MOORE, PRANGLEY & CLAYTON
ATTORNEYS

March 18, 1958 H. A. SKOG 2,827,088
FRUIT PITTING MACHINE
Original Filed Dec. 14, 1950 13 Sheets-Sheet 6

INVENTOR.
HENRY A. SKOG
BY
MOORE, PRANGLEY & CLAYTON
ATTORNEYS

March 18, 1958     H. A. SKOG     2,827,088
FRUIT PITTING MACHINE
Original Filed Dec. 14, 1950     13 Sheets-Sheet 7
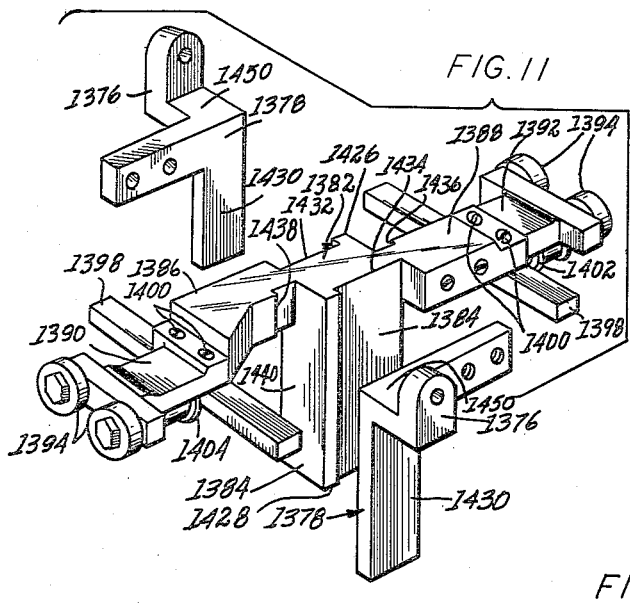
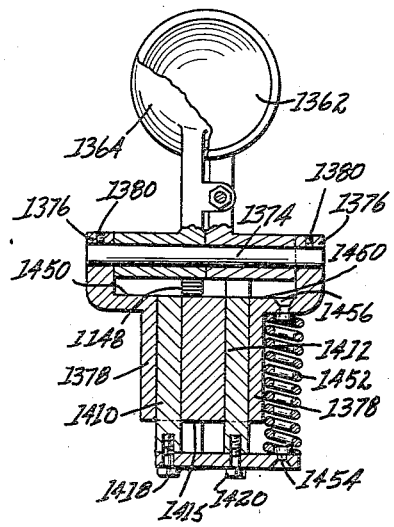
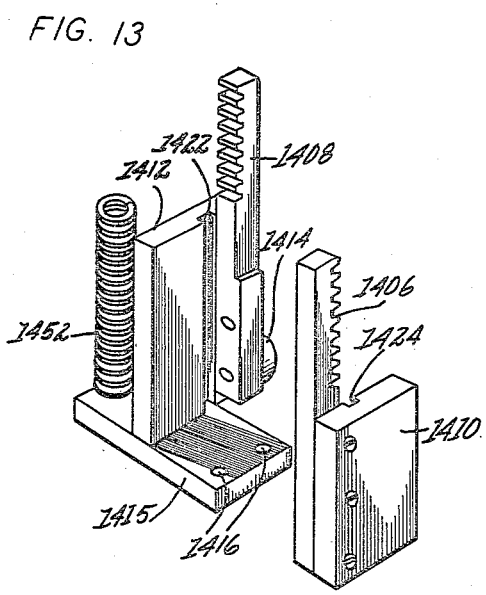
INVENTOR.
HENRY A. SKOG
BY
MOORE, PRANGLEY & CLAYTON
ATTORNEYS

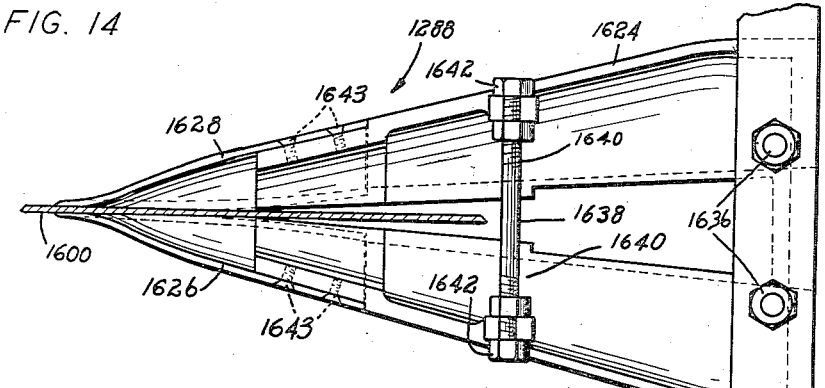
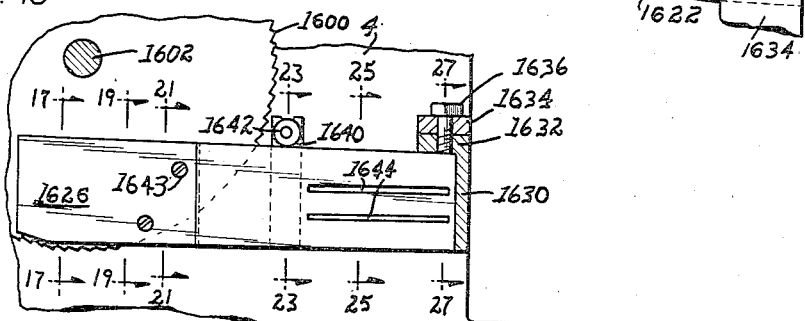
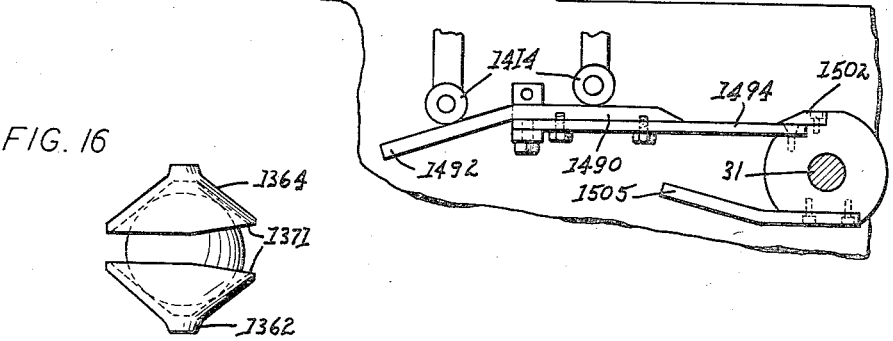
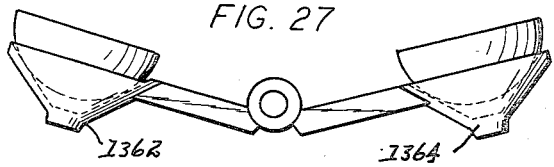

March 18, 1958 H. A. SKOG 2,827,088
FRUIT PITTING MACHINE
Original Filed Dec. 14, 1950 13 Sheets-Sheet 9
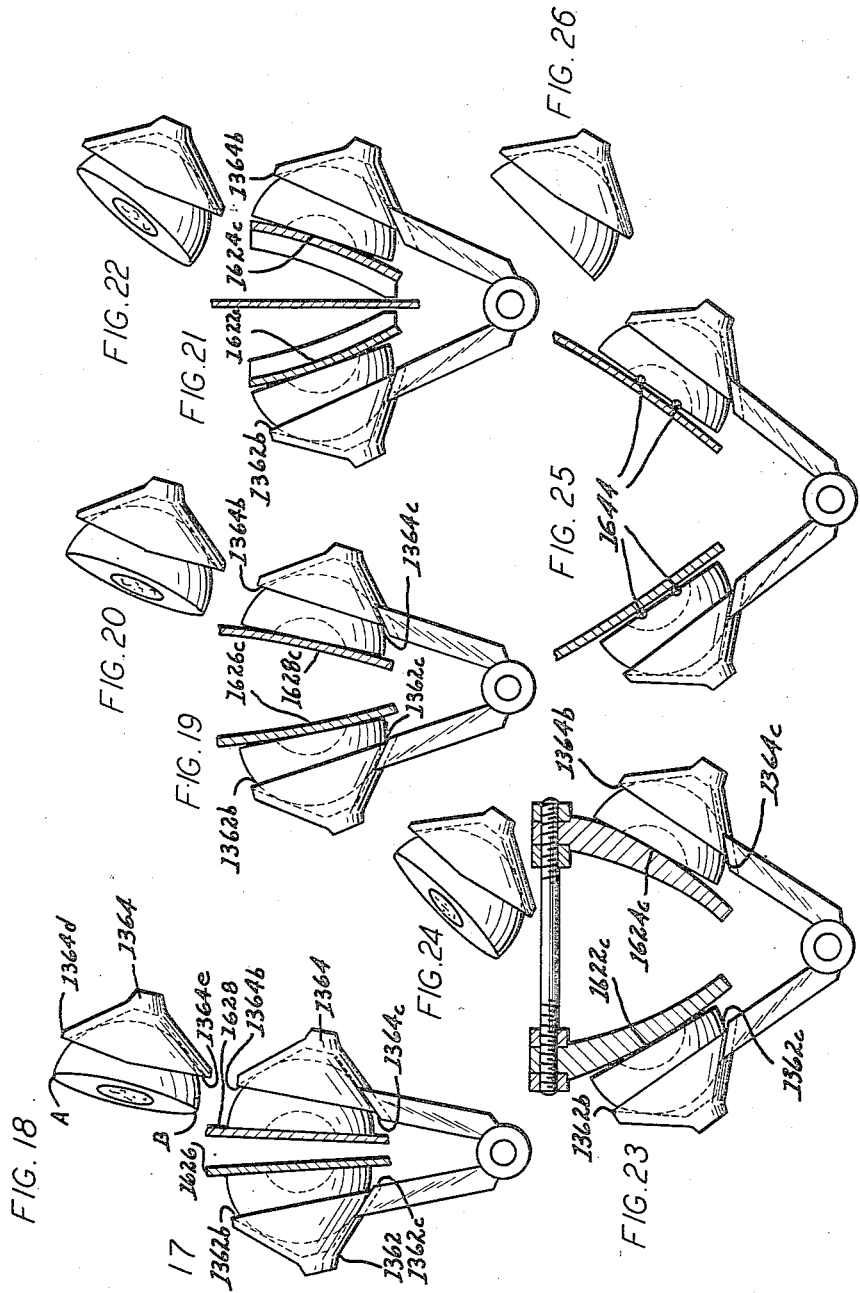
INVENTOR.
HENRY A. SKOG
BY
MOORE, PRANGLEY & CLAYTON
ATTORNEYS

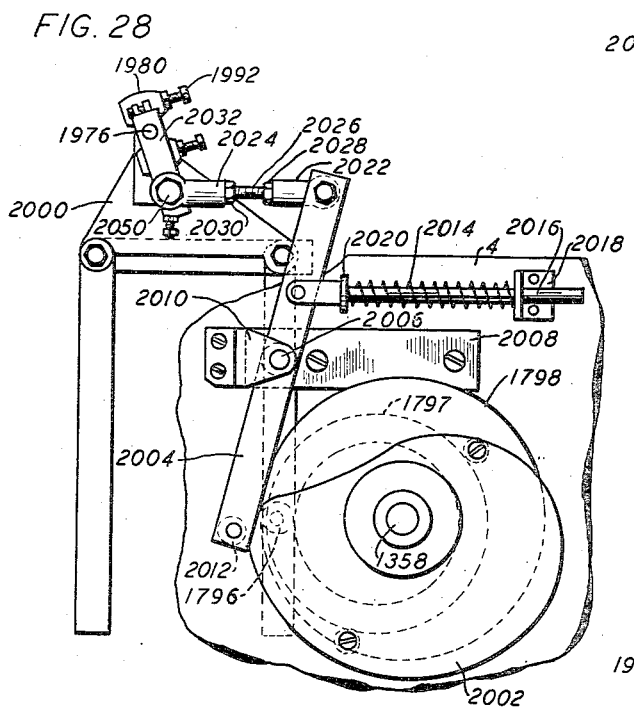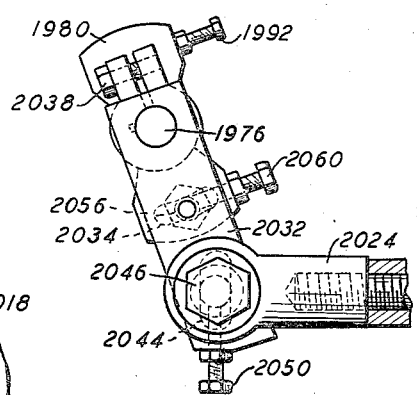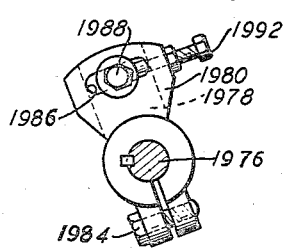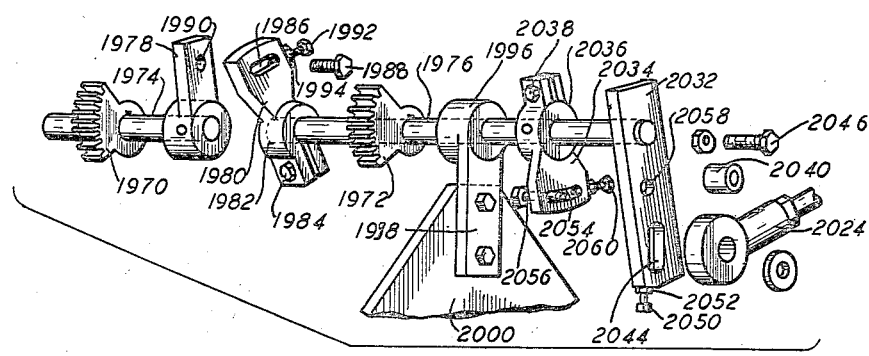

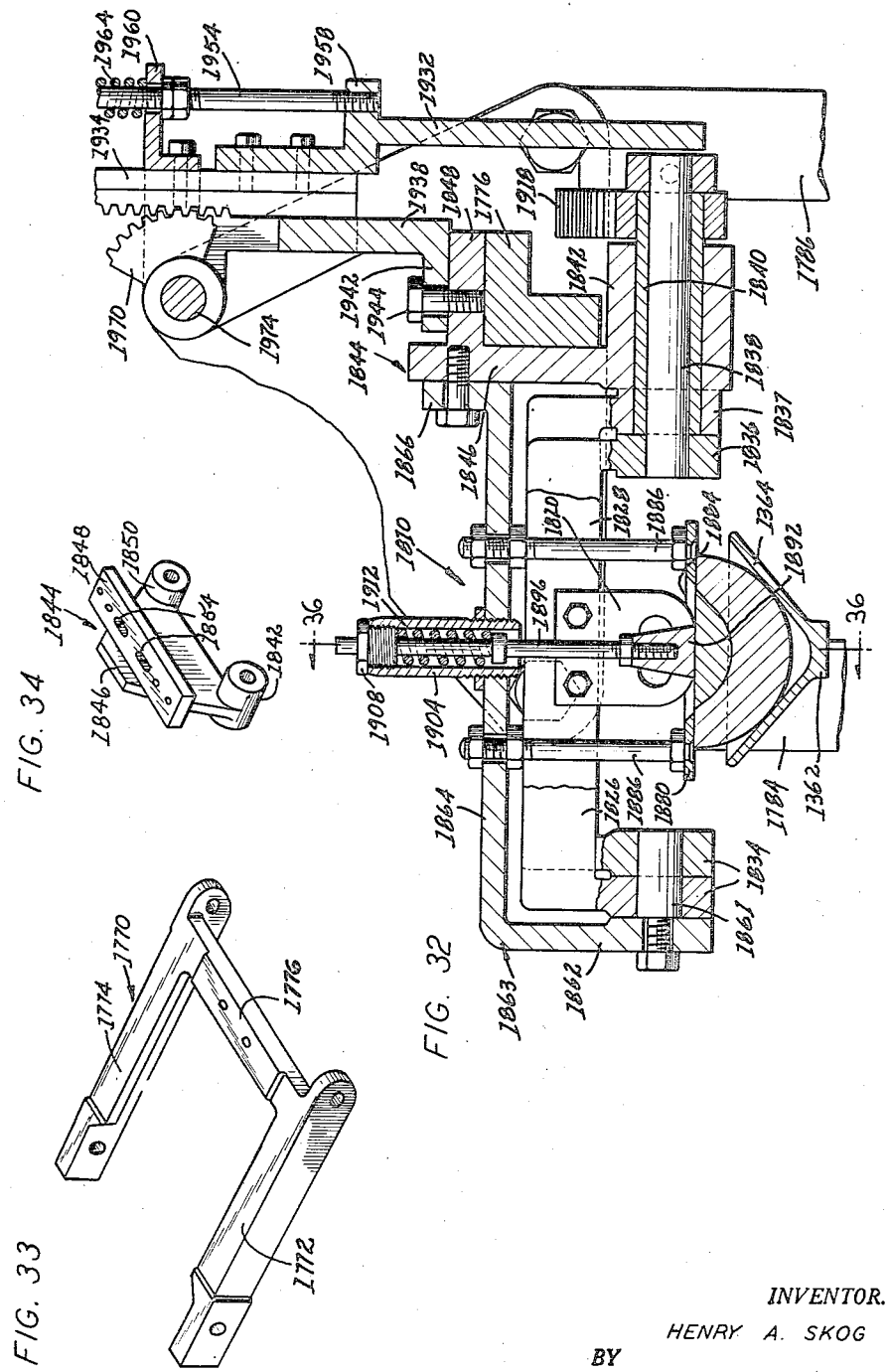

March 18, 1958  H. A. SKOG  2,827,088
FRUIT PITTING MACHINE
Original Filed Dec. 14, 1950  13 Sheets-Sheet 12

INVENTOR.
HENRY A. SKOG
BY
MOORE, PRANGLEY & CLAYTON
ATTORNEYS

March 18, 1958     H. A. SKOG     2,827,088
FRUIT PITTING MACHINE

Original Filed Dec. 14, 1950     13 Sheets-Sheet 13

INVENTOR.
HENRY A SKOG
BY
MOORE, PRANGLEY & CLAYTON

ATTORNEYS

United States Patent Office 2,827,088
Patented Mar. 18, 1958

2,827,088

FRUIT PITTING MACHINE

Henry A. Skog, Olympia, Wash., assignor to Special Equipment Company, Portland, Oreg., a corporation of Oregon Original application December 14, 1950, Serial No. 200,705, now Patent No. 2,788,818, dated April 16, 1957. Divided and this application March 15, 1955, Serial No. 494,365

11 Claims. (Cl. 146—28)

This invention relates to a method and apparatus for processing peaches and similar fruit.

The present application is a division of my co-pending application for United States Letters Patent Serial No. 200,705, filed December 14, 1950, entitled "Fruit Treating Machine," issued April 16, 1957, as Patent No. 2,788,818 and is filed in response to a requirement for restriction.

Among the objects of the invention are to provide a high speed fruit splitting, bisecting and sawing, pitting or deseeding machine; to provide, in a fruit splitting, bisecting and sawing, pitting or deseeding machine, wherein the fruit is fed to the bisecting, pitting or deseeding mechanisms at a continuous uniform rate, new or improved means for spreading or separating the fruit halves after bisecting and while the fruit is being carried at such continuous uniform rate from the bisecting mechanism to the pitting or deseeding mechanism; to provide high speed pitting mechanisms traveling with and relative to a continuously moving fruit conveyor for ptting fruit without interrupting the movement of the conveyor; to provide new or improved traveling, pitting mechanism and driving mechanism therefor for pitting fruit as it is being fed at a continuous uniform rate; to provide improved or simplified driving mechanism for a traveling, pitting mechanism.

These and other objects of the invention will be hereinafter more fully evident from a perusal of the following specification when taken in connection with the accompanying drawings wherein:

Fig. 11 is a view in exploded perspective of a traveling carriage for the fruit holder or cup unit for the splitting, spreading and pitting mechanism;

Fig. 12 is a fragmentary view in vertical section taken along the line 12—12 of Fig. 10;

Fig. 13 is a view in vertical perspective of the cup actuating racks of the fruit holding unit or cups of Figs. 5 to 12;

Fig. 14 is an enlarged view in vertical section taken substantially along the line 14—14 of Fig. 5;

Fig. 15 is a diagrammatic view in elevation of the spreader unit of Fig. 14 illustrating the location of the cup control cam in relation to the spreader unit;

Fig. 16 is a fragmentary plan view of the cup unit holding the peach;

Figure 1:
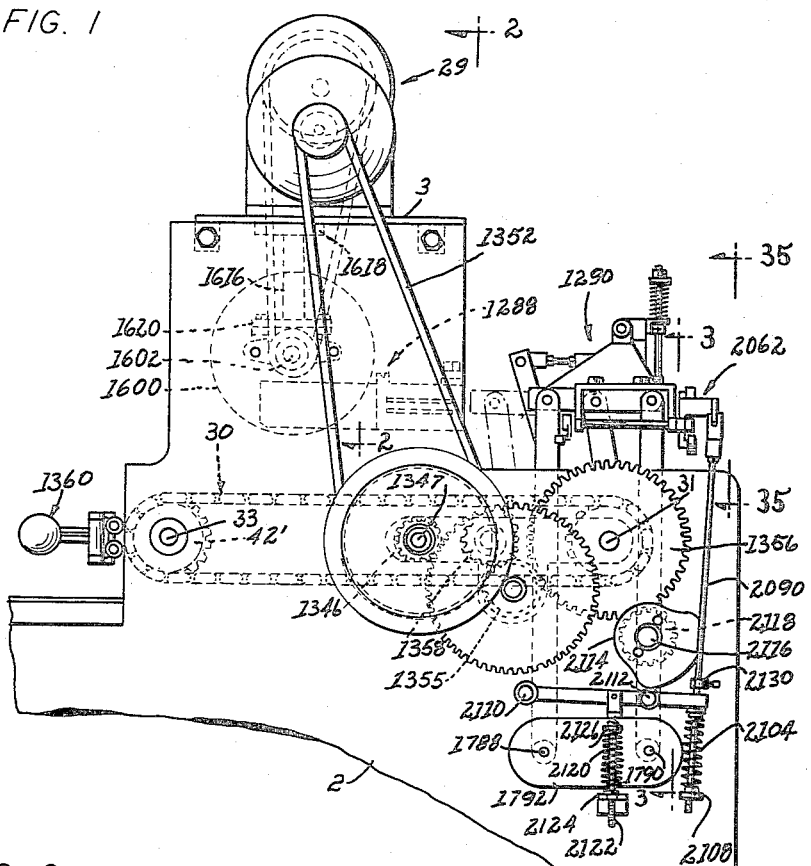
Fig. 1 is a fragmentary view in side elevation of a machine embodying the invention.
Figure 3:
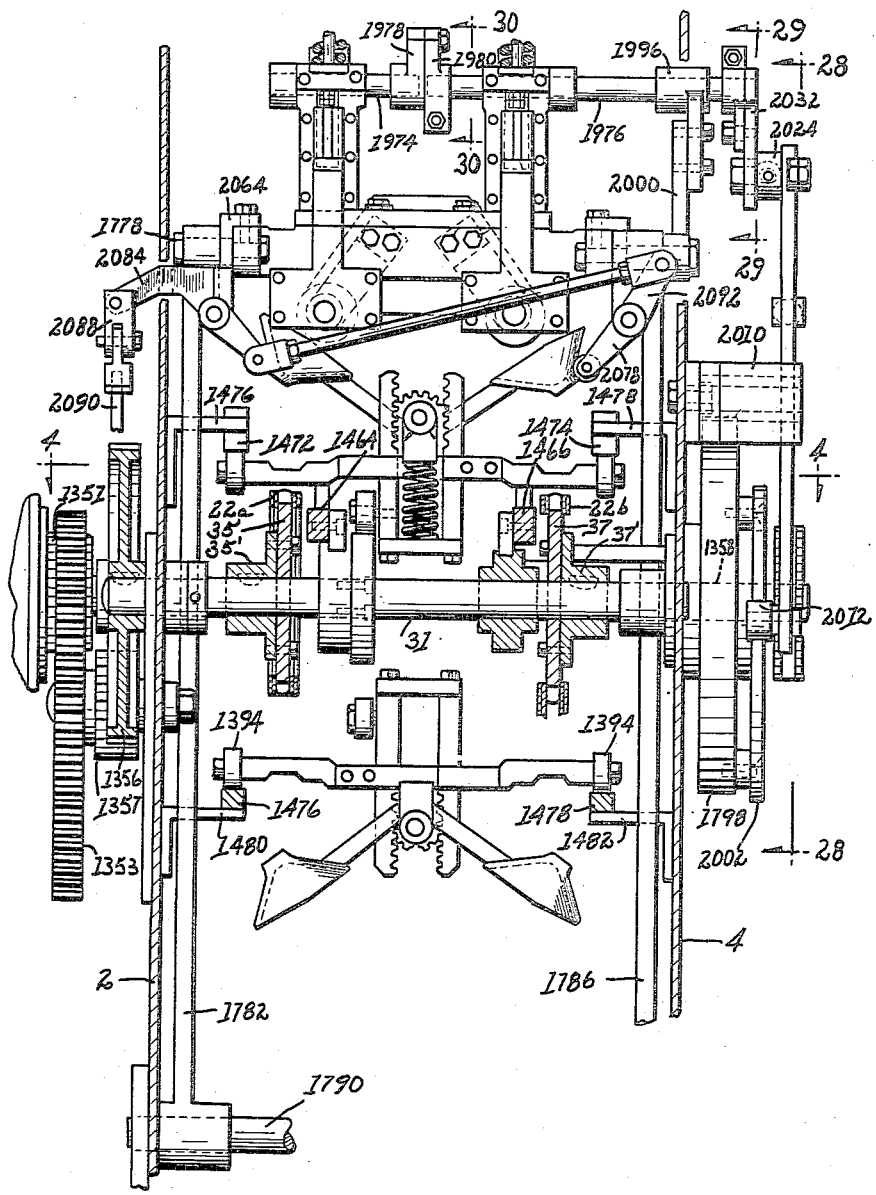
Fig. 3 is an enlarged cross-sectional view taken on line 3—3 of Fig. 1.
Figure 35:
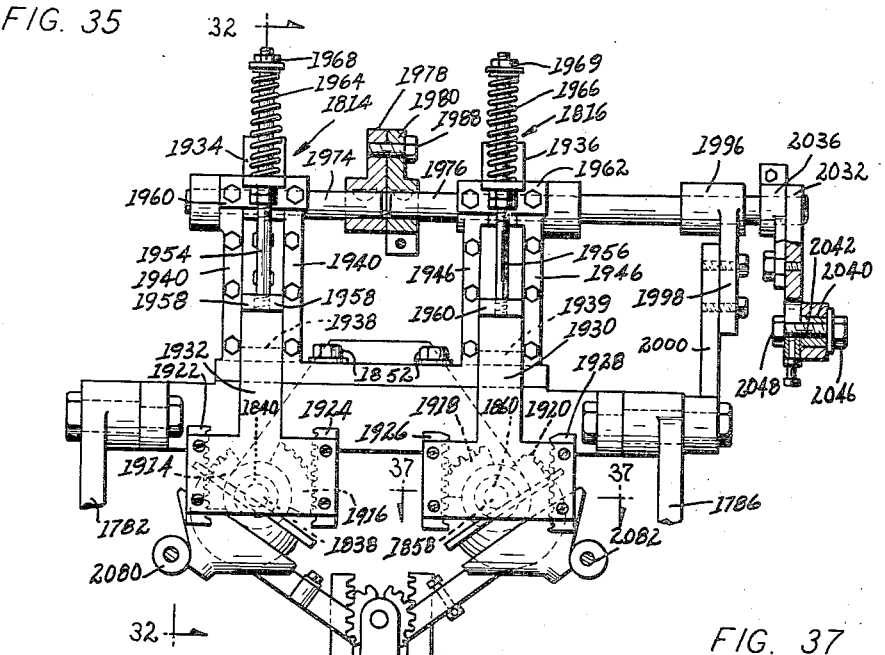
Figure 37:
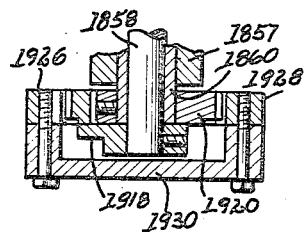
Figure 36:
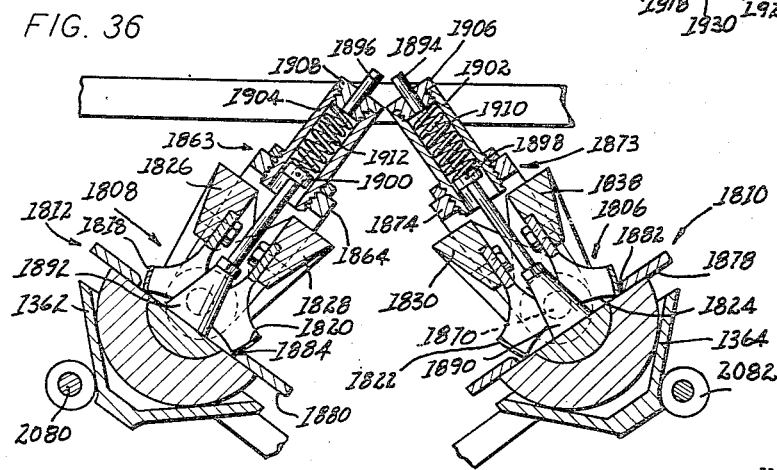
Figure 38:
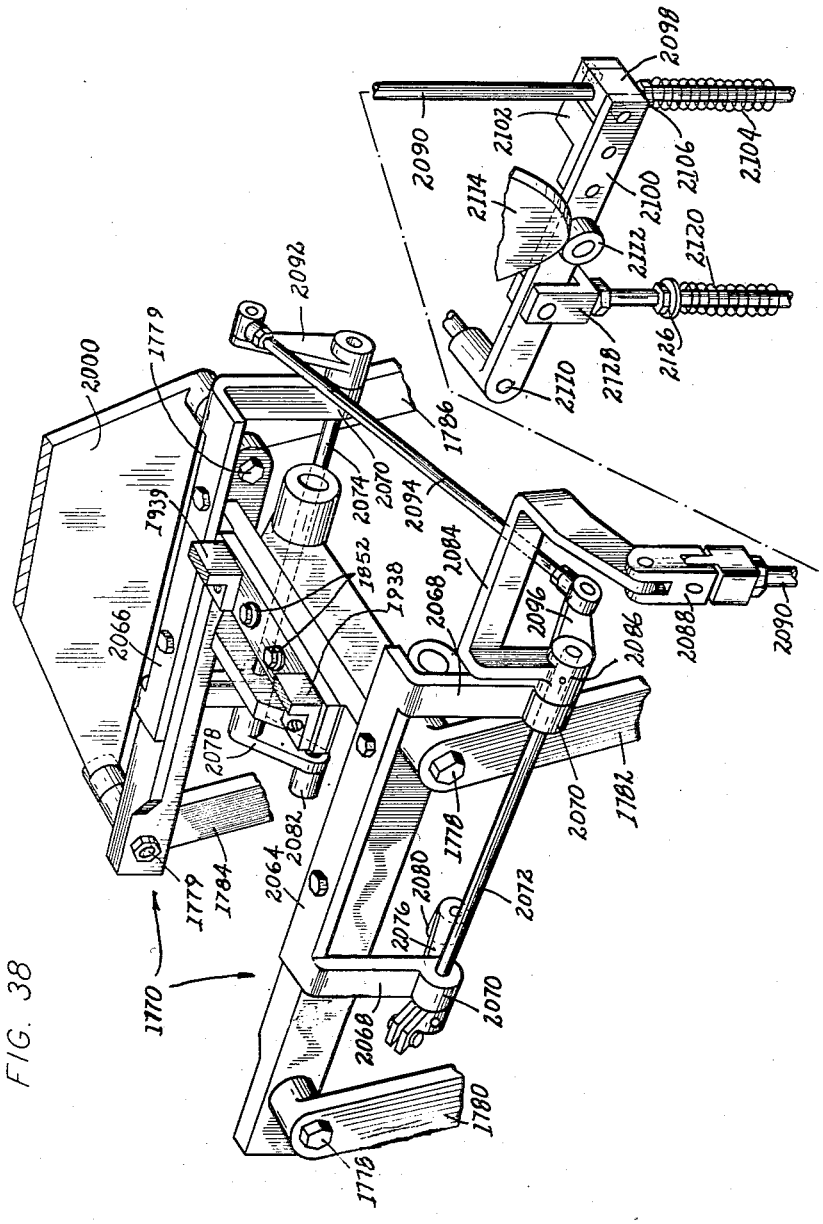

Figs. 17 to 27 are operation diagrams illustrating the spreading of the fruit halves and the opening of the cups as they are conveyed past the spreader unit, Figs. 17, 19, 21, 23, 25 and 27 being taken along position lines 17—27 respectively, of Figs. 14 and 15;

Fig. 28 is a fragmentary view in vertical section taken substantially along the line 28—28 of Fig. 3;

Fig. 29 is a fragmentary enlarged view in vertical section taken substantially along the line 29—29 of Fig. 3;

Fig. 30 is a fragmentary enlarged view in vertical section taken along the line 30—30 of Fig. 3;

Fig. 31 is a view in an exploded perspective of the parts of the mechanism shown in Figs. 28 to 30;

Fig. 32 is an enlarged view in vertical section taken substantially along the line 32—32 of Fig. 35;

Fig. 33 is a view in perspective of the frame casting of the pitter mechanism of Fig. 32;

Fig. 34 is a view in perspective of the mounting bracket of the pitter mechanism of Fig. 32;

Fig. 35 is an enlarged view in end elevation of the pitter mechanism along the line 35—35 of Fig. 1;

Fig. 36 is a fragmentary view in vertical section taken substantially along the line 36—36 of Fig. 32;

Fig. 37 is an enlarged fragmentary view in horizontal section taken substantially along the line 37—37 of Fig. 35; and Fig. 38 is a view in perspective of the supporting and actuating mechanisms of Figs. 28 to 37.

Referring now to the drawings in detail, a preferred embodiment of a machine constructed in accordance with the present invention comprises a machine frame having side plates 2 and 4 (Figs. 1 and 3) spaced apart by a plurality of cross members (not shown). Angle irons (not shown) extend crosswise of the side plates at the bottom thereof to form supporting feet for the machine frame.

A combined motor and speed reducer gear unit 29 (see Figs. 1 and 2) operates to drive through mechanism hereinafter described, a conveyor 30 for carrying the fruit to halving and pitting mechanisms. This conveyor 30 is an endless conveyor having a drive shaft 31 (Figs. 1 and 4).

The conveyor, fruit feeding mechanism or device 30 (Figs. 1 to 13) for feeding the oriented whole fruits past the splitting, spreading and pitting mechanisms, preferably comprises an endless conveyor consisting of a pair of sprocket chains 22a and 22b passing at the rear, discharge end of the machine over drive sprockets 35 and 37 adjustably secured, as by bolts 39 (Fig. 5) received in arcuate slots 39' in the sprockets, two collars 35' and 37' (Figs. 3 and 4) secured to a drive shaft 31 journaled in suitable bearing brackets 41 bolted to the side frame plates 2 and 4. The sprocket chains at their forward or feed-in end pass over sprockets 42' and 43' (Figs. 2 and 6) fastened to the cross shaft 33 mounted in bearings 45' bolted to the side frame plates 2 and 4.

Figure 4:
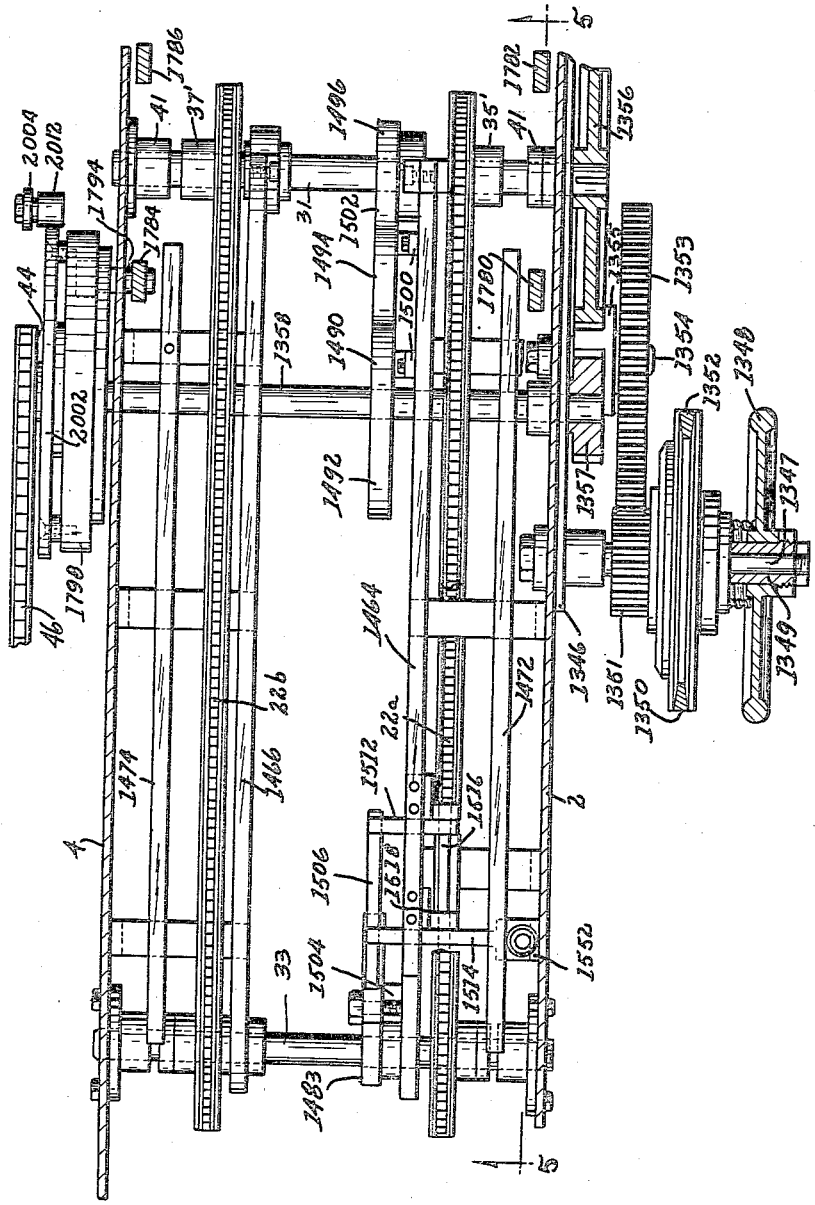
Fig. 4 is a fragmentary view in vertical section taken substantially on line 4—4 of Fig. 3.

An elongated casting 1346, Figs. 1 and 4, is bolted to the side frame plate 2 and has threaded into it a stud shaft 1347 (Fig. 4). A hand wheel 1348 is mounted on the outer end of a rotatable sleeve 1349 on the stud shaft 1347, the sleeve being connectible by a manually operable clutch of any suitable construction to a drive pulley 1350 journaled on the sleeve 1349. The sleeve 1349 is connected or fixed in any suitable manner to a gear 1351. The pulley 1350 is driven through belt 1352 (Figs. 1 and 2) from the slow speed shaft 29a of the combined motor and speed reducer 29. The gear 1351 meshes with and drives a larger gear 1353 journaled on a stud shaft 1354 carried by the casting 1346. The gear 1353 has attached to it a smaller gear 1355 which is also journaled on the stud shaft 1354, the gear 1353 meshing on one side with drive gear 1356, secured to one end of the conveyor drive shaft 31 and one the other side with a gear 1357 secured to the outer end of a cross shaft 1358 journaled in suitable brackets bolted to the side frame plates 2 and 4.

Figure 5:
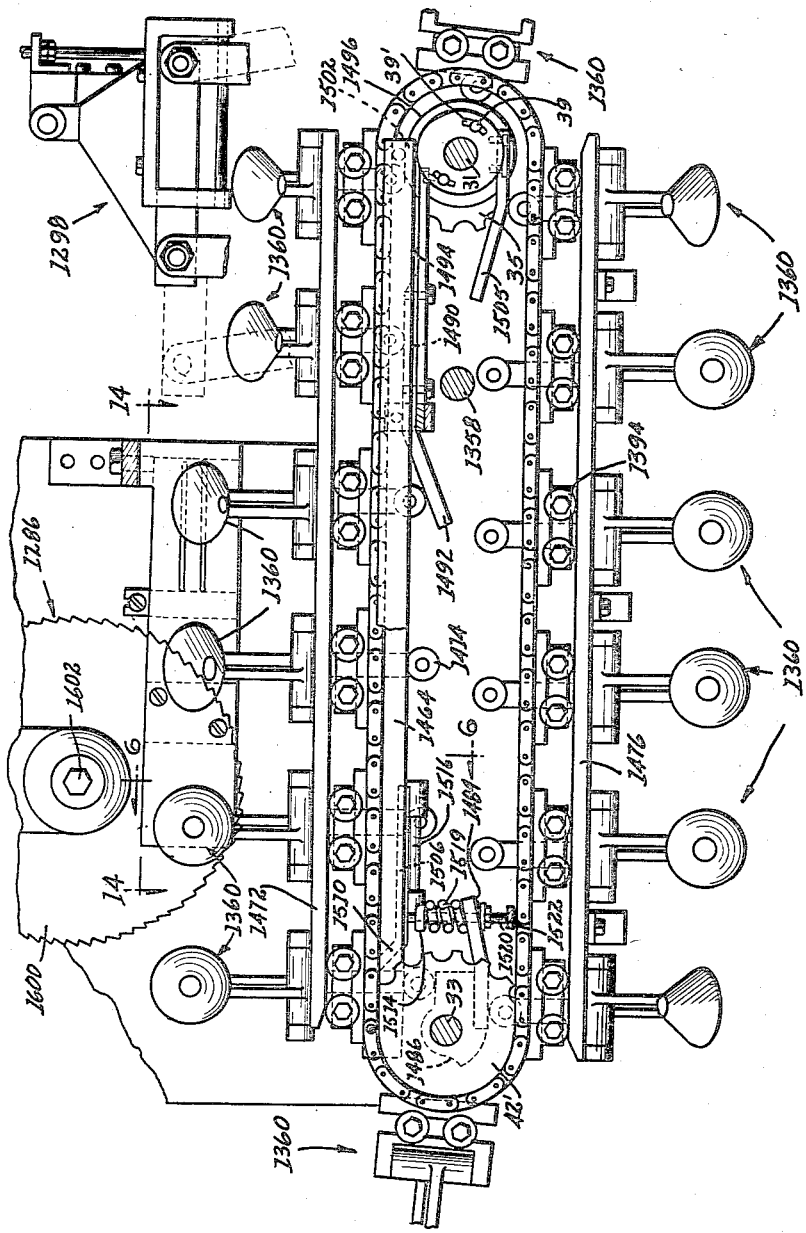
Fig. 5 is a fragmentary view in vertical section taken substantially on the line 5—5 of Fig. 4.

The sprocket chains 22a and 22b, throughout their entire lengths, are provided with a series of equally spaced, whole fruit holders, cups or supporting devices 1360 (Fig. 5).

Figure 6:
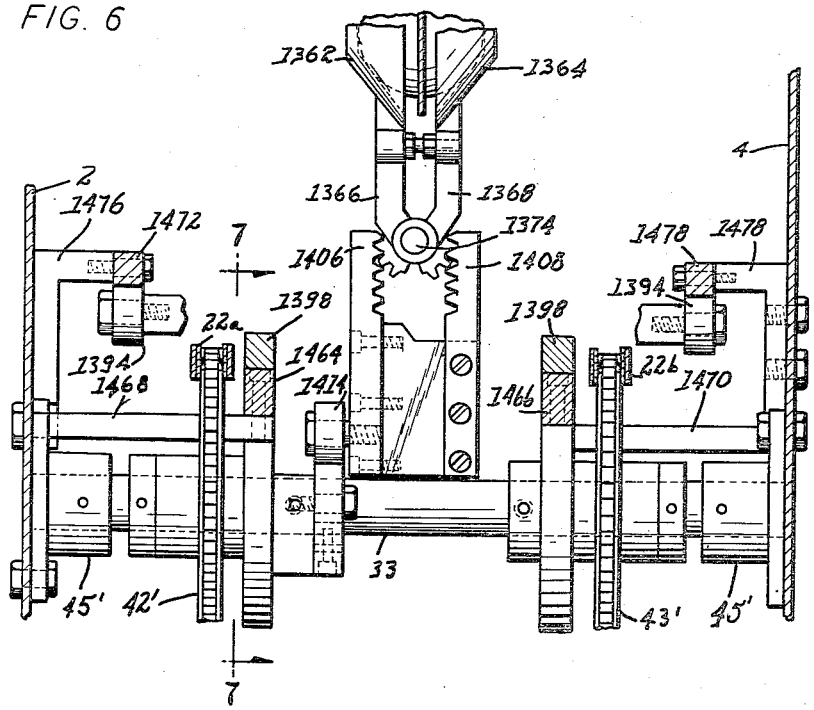
Fig. 6 is a fragmentary view in vertical section taken along the line 6—6 of Fig. 5.
Figure 8:
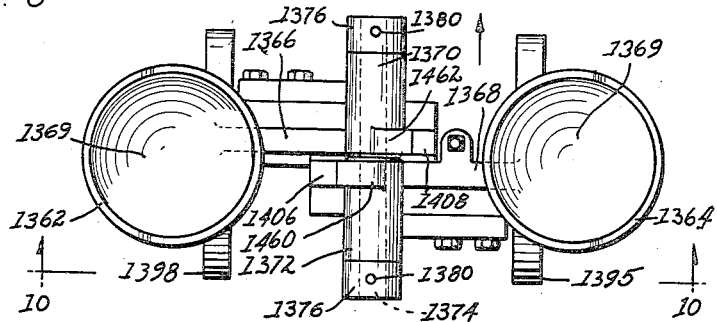
Fig. 8 is a fragmentary plan view looking along the line 8—8 of Fig. 10.
Figure 9:
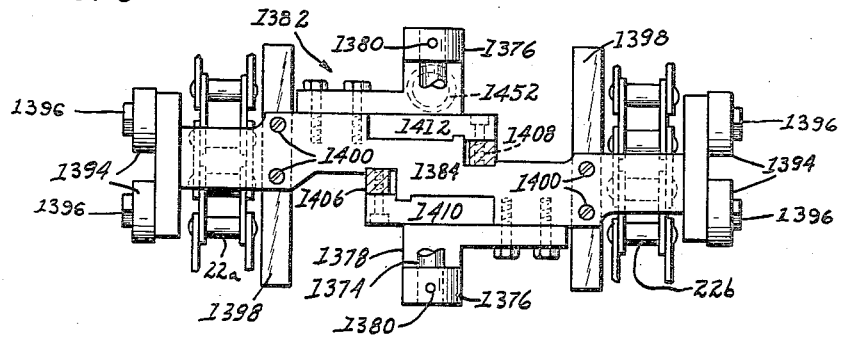
Fig. 9 is a fragmentary view in the horizontal section taken substantially along the line 9—9 of Fig. 10.
Figure 10:
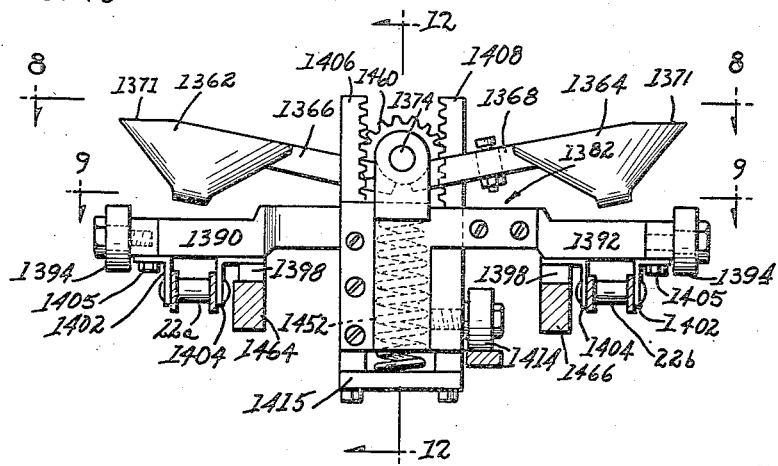
Fig. 10 is a fragmentary view in vertical section taken along the line 10—10 of Fig. 8.

Each whole fruit holder, cup or supporting device 1360 comprises a pair of half fruit holders, cups or cup sections 1362 and 1364, Figs. 8 to 10 and 12. The inner wall 1369 of each of these cups is conical in form and the outer edges of the rim of each cup are cut away or relieved as at 1371. Each cup section is an internally cone-shaped, half fruit holder when the cups are "open" or "partially open." The half cups when in horizontal lowered position, as illustrated in Figs. 8 and 10, form an open top, half fruit receptacle having conical internal surfaces. The two sections when in raised position, as illustrated in Figs. 5, 6 and 12, form closed, whole fruit receptacles or clamps having opposed, conical, internal walls confronting each other along their base planes, but in spaced relation to a vertical plane coincident with the suture plane of the whole fruit.

The cup segments or sections 1362 and 1364 are formed integrally with lever arms 1366 and 1368 having bosses 1370 and 1372 (Fig. 8) at their inner ends journaled on a shaft 1374. The shaft 1374 is mounted in bosses 1376 of opposite end brackets 1378, the shaft being held against rotation with respect to the brackets as by set screws 1380. The brackets 1376 are mounted on a carriage 1382 shown in Figs. 9 to 11. This carriage comprises a central dependent body portion or block 1384 (Fig. 11) and laterally extending arm portions 1386 and 1388 extending oppositely from opposite diagonal corners of the central body portion or block 1384. The end portions 1390 and 1392 of the arms 1388 are offset oppositely so that their opposite side edges are aligned. Pairs of wheels or rollers 1394 are suitably journaled as at 1396 on each of the free ends of the portion 1390 and 1392 of the carriage. Carriage supporting shoes or slides 1398 are secured by screws or bolts 1400 to the undersurfaces of the portions 1390 and 1392 of the carriage. Chain attachment links 1402 and 1404 are bolted to the undersurface of the end portions 1390 and 1392 of the carriage arms 1386 and 1388, the chain attachment links 1402 being secured by bolts 1405, see Fig. 10, and the chain attachment links 1404 having their side flanges received in notches in the upper surfaces of the shoes 1398 and each secured to the carriage by one of the bolts 1400 by which its associated shoe is secured. It should be noted that the end portions 1390 and 1392 of the carriage arms 1386 and 1388 are recessed in their upper surfaces as shown in Fig. 10 to receive the bottom portions of the cup segments 1362 and 1364 so that the cup segments may be swung into an open horizontal or near horizontal position as shown in Fig. 10.

The cup halves 1362 and 1364 are operated by racks 1406 and 1408, Figs. 6, 9, 10 and 13, the rack 1406 being bolted to one edge of a slide block 1410 and extending upwardly therefrom while the rack 1408 is bolted to the opposite side edge of a like block 1412. An actuating roller 1414 is journaled on a bolt threaded into the side of the rack 1408 adjacent its lower end. The blocks are secured to a lateral extension or arm 1415 having spaced holes 1416 receiving bolts 1418 and 1420 fastening the parts. The blocks 1410 and 1412 are formed on their inner surfaces with longitudinally extending guide slots 1422 and 1424 receiving guide projections or splines 1426 and 1428 respectively formed at diagonally opposite corners of the central body portion 1384 of the carriage. The mounting brackets 1378, Figs. 9 and 11, for the cup carrying shaft 1374 are formed with horizontal arms apertured to receive mounting bolts by which the arms are secured to opposite edges of the arms 1386 and 1388 of the carriage 1382. The brackets are also formed with depending portions 1430, cooperating with the vertical, recessed surfaces 1432 and 1434 of the central block 1384 of the carriage to form spaced guide surfaces for the slide blocks 1410 and 1412 carrying the racks 1406 and 1408. Recesses 1436 and 1438, formed in the edges of the arms 1386 and 1388, cooperate with the opposed side surfaces 1440 of the body portion 1384 to form guide surfaces for the racks 1406 and 1408. Each bracket 1378 is also formed with a horizontal shelf portion 1450, see Fig. 11.

A spring 1452, Figs. 9, 10, 12 and 13, urges the cup segments to raised position or to a position substantially at right angles to the carriage 1382. This spring 1452 is a coil spring which at its lower end encircles a pin 1454 and bears upon the extension or arm 1415, see Figs. 10 and 12, and encircles at its upper end a pin 1456 and bears upon the underside of the shelf-like portion 1450 of the bracket 1378 with which the slide block 1412 is associated.

It should be noted that the rack 1406 meshes with gear teeth 1460 (Figs. 8 and 10) formed on the mounting boss 1372 for the cup segment 1364 while the rack bar 1408 meshes with the gear teeth 1462 formed on the mounting boss for the cup segment 1362. Hence, as the racks 1406 and 1408 are lowered the cup segments 1362 and 1364 are raised and as the racks 1406 and 1408 are raised the cup segments are lowered.

Each cup holder carriage 1382 is confined or restricted, in its movements along the upper flights of the chains or conveyor, to a definite horizontal plane without deviation or deflection therefrom as it passes from the front end of the machine to the rear end of the machine between the sprockets 42' and 43', Figs. 1, 5 and 6, and the drive sprockets 35 and 37, Figs. 1, 3 and 5. This confining, restricting or guiding of the movements of each carriage 1382 is accomplished by a pair of guide tracks 1464 and 1466, Figs. 3 and 5 to 7, mounted on the outer ends of brackets 1468 and 1470 respectively secured to the side frame plates 2 and 4. The guide tracks 1464 and 1466 cooperate with the slide shoes 1398 secured to the under surface of each carriage 1382, the shoes riding on the upper surfaces of the guide tracks 1464 and 1466 so as to support the carriage against movement in a downward direction. The rollers 1394 at the opposite sides of each carriage 1382 engage and roll along overhanging guide tracks 1472 and 1474, Figs. 1 and 5 to 7, supported on the outer end of brackets 1476 and 1478 respectively secured to the side frame plates 2 and 4. The guide tracks 1472 and 1474 serve as a guide confining the carriages against upward movement from the front to the rear of the machine along the upper flight of the chains or conveyor. It will be evident that the confining or guiding tracks 1464, 1466, 1472 and 1474 serve not only a guiding function but also serve a clamping function in that they clamp the carriage against vertical movement so that by forces applied to the rollers 1414 or by springs 1452 to the slide block 1412, the racks 1406 and 1408 may move up or down to swing the cup segments to the various positions. These tracks serve also to take the load of the carriages off the chains so that relatively light sprocket chains or conveyors may serve to move the carriages and hence convey the fruit holders through their designed path. The movements of the carriages along the lower track of the chains or conveyor, from the rear to the front end of the machine, are guided and the carriages supported by tracks 1476 and 1478, Figs. 3 and 5, secured to the outer end of brackets 1480 and 1482 respectively secured to the side frame plates 2 and 4. The rollers 1394 of each carriage engage and roll on the upper surfaces of the tracks 1476 and 1478 and thereby support the weight of the carriages and thereby relieve the chains of that weight and decrease the bearing pressure on shafts 31 and 33. The cup segments are moved to open positions or to partially open positions, and allowed to move to closed positions as they are moved continuously along their endless path by a plurality of cam, guide or control tracks, engaging the rollers 1414, as best seen in Figs. 4 to 7. These tracks comprise a plurality of generally flat tracks 1481, 1483 for controlling the cup segments, the track 1481 extending from a rear, inclined cam surface 1484 to a forward cam surface 1485 concentric to the axis of the shaft 33. The cam surface 1485 terminates in an abrupt, convex cam surface 1486 (permitting rapid closing of the cup sections). The cam surface 1486 is followed by a cam surface 1487, concentric to the shaft 33 and extending from surface 1486 to the flat track 1483.

Figure 7:
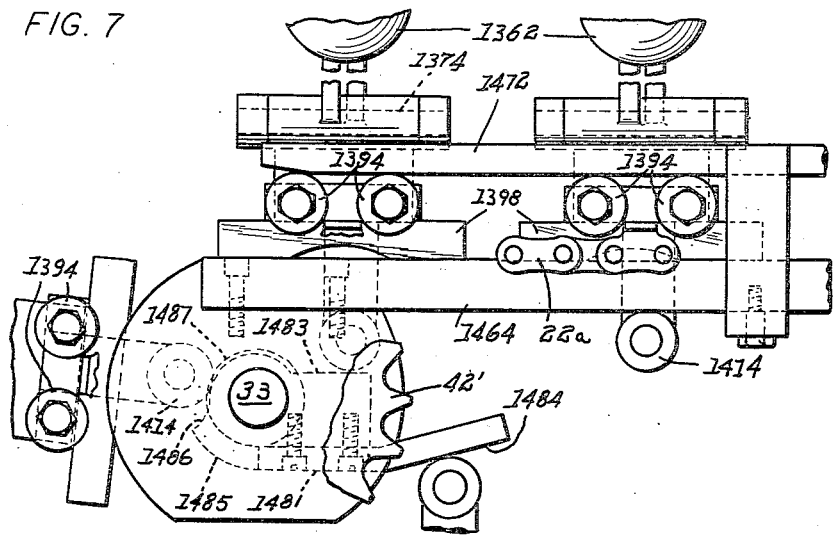
Fig. 7 is a fragmentary view in horizontal section taken along the line 7—7 of Fig. 6.

A track 1490, adjacent the rear sprocket, controls the positioning of the two cup segments in partially open position for cooperation with the pitting or deseeding mechanism. This track is aligned longitudinally of the machine with track 1483 so as also to engage the actuating roller 1414 of the cup segments. This track 1490 has at its forward end an inclined, camming section 1492 which engages and raises the actuating rollers 1414. This track has also an intermediate recessed portion or surface 1494 which permits the actuating roller 1414 to drop down, thereby raising the cup segments slightly to position the fruit halves in proper engagement with the pitting mechanism. The track 1490 at its rear end merges into a curved track or surface 1496 which is concentric to the axis of the drive shaft 31. The guide surface 1496 may be provided by a disk or collar in which the shaft 31 is journaled but which is held against rotation by being pinned or otherwise secured to the stationary track 1490, the track 1490 being fixed to brackets 1500, Fig. 4, secured to the carriage track 1464. It should be noted that the portion 1502 of the track 1490 between the recessed portion 1494 and the arcuate surface 1496 is of greater height or thickness than the flat portion of the track in advance of the recess 1494 so that while the cup sections are partially opened as the cup control rollers 1414 reach the recess 1494 they are fully opened as the cup rollers 1414 pass from the recessed portion 1494. The arcuate surface 1496 retains the cup sections in fully open position as the rollers 1414 move around the drive sprockets 35 and 37. The tracks 1481 and 1483 may be secured in any convenient manner, as by brackets 1504, Fig. 4 (of which one only is shown) to the carriage track 1464, the tracks 1464 and 1466 having at their forward ends concentric circular surfaces interfitting concentric, recessed surfaces in the shoes 1398 as shown in Fig. 7.

A cam track 1505, Fig. 5, extending forwardly from the cam surface 1496 retains the rollers 1414 in lowered position until they pass forwardly beyond the shaft 31 and parts secured thereto.

In addition, an auxiliary control device, track or guide 1506 (Figs. 4 and 5) is provided for actuating the roller 1414 of the cup segments to supply an auxiliary additional tension to the cups during the splitting or sawing operation. The track 1506 comprises a bar extending longitudinally in alignment with the plane of the track 1483. Track 1506 is provided at its forward end with an inclined cam surface 1501 under which the roller 1414 is adapted to pass and to be depressed by the track as the cup carrier advances. The track 1506 is mounted on spaced bars 1512 and 1514, the bar 1512 being secured to a rod 1516 journaled in spaced brackets 1518 bolted to the under surface of the carriage track 1464. The bar 1514 is also secured to the rod 1516 but passes beyond said rod to overlie at its free end a coil spring 1519 which bears at its lower end on a washer adjustably mounted on a vertical rod 1520 (Fig. 5) supported by and upstanding from a bracket 1522 bolted to the side frame plate 2, the other end of the spring 1519, acting through the pivoted bar 1514 to depress the track 1506.

*The splitting and sawing mechanism and the separating and spreading mechanism*

Figure 2:
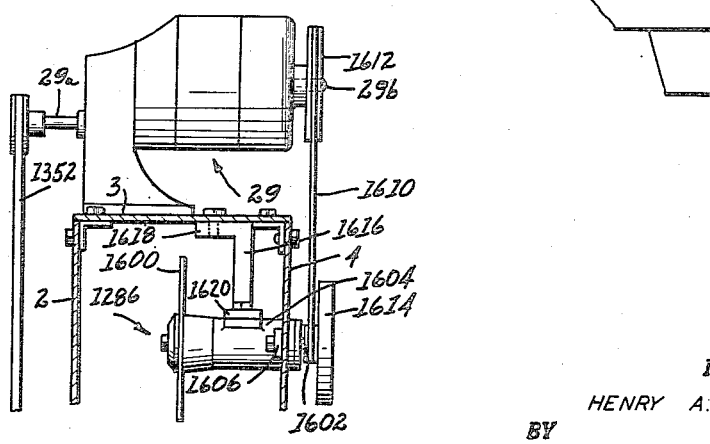
Fig. 2 is a view taken on the line 2—2 of Fig. 1.

The splitting or sawing mechanism 1286 comprises, as best shown in Figs. 1, 2, 5 and 14, a rotary saw 1600 secured to a shaft or arbor 1602 which is journaled in an arbor housing 1604 that extends through a suitable opening in an upstanding portion of the side plate 4. The arbor housing is secured to said side plate as by brackets 1606 bolted to the end of the arbor housing and also bolted to the side plate. The arbor shaft 1602 extends beyond the arbor housing 1604 on the right side of the machine as shown in Fig. 2 and has secured to it a pulley driven by a belt 1610 in turn driven by a pulley 1612 secured to the high speed shaft 29b of the combined motor and speed reducer 29. The shaft 1602 also has secured to it a fly wheel 1614 which equalizes the rim speed of the saw while the pit of the peach is being cut in two.

The saw arbor housing 1604 is also supported by a bracket 1616 having an upper horizontal plate portion 1618, Fig. 1, bolted to the top plate 3 and a lower horizontal plate portion 1620 bolted to the saw arbor housing.

The separating or spreading mechanism 1288 comprises four stationary separating or deflecting blades or members 1622, 1624, 1626, and 1628, Fig. 14, the members 1622 and 1624 being formed at their rear ends with an integral cross member including a vertical wall 1630, Fig. 15, and a horizontal bar 1632. The bar 1632 is mounted on a cross member 1634 as by bolts 1636, the cross member 1634 being secured in any desired manner to the upstanding portions of the side plates 2 and 4. The spreader members 1622 and 1624 are adjustably connected and reinforced intermediate their ends by a cross rod 1638 received in notches in the upper ends of reinforcing straps 1640 spot welded or otherwise fixed to or formed integrally with the spreader members. The cross rod 1638 is adjustably secured to each of the straps 1640 by means of opposed clamping nuts 1642. By adjusting of the rod 1638 and the clamping nuts 1642 the spacing of the spreader members 1622 and 1624 may be adjusted relative to the saw 1600 to obtain the proper clearance between the saw and the spreader blade.

The front spreader members 1626 and 1628 comprise sheet metal members fastened at their rear ends as by screws 1643 appropriately countersunk in the spreader plates 1626 and 1628 so as to be flush with the surface of those plates. The spreader plates 1626 and 1628 closely approach at their forward ends the plane of the saw 1600 and may be beveled at their forward edges so that the fruit halves split or sawed by the blade 1600 pass readily from the saw blade onto the opposite surfaces of the spreading or deflecting members 1626 and 1628. The form of the spreader members or blades 1622, 1624, 1626 and 1628 will be evident from Figs. 14, 15, and 17 to 25. As clearly illustrated in Fig. 14, the spreader member formed by the spreading or deflecting blades 1622 and 1626 on the one side and the spreader member formed by the deflecting blades 1624 and 1628 on the other side diverge from their forward to their rear end in a horizontal plane and as evident from Figs. 17 to 25, diverge from bottom to top in a vertical plane.

The forward end portions of the blades in horizontal sections are substantially parallel to the saw as can be seen in Fig. 14, and in vertical sections they diverge from bottom to top quite gradually, as will be seen from Fig. 17. These forward end portions thus effect a gradual divergence of the peach halves from the plane of the saw while they are engaged by or in contact with the splitting saw.

Just in advance of the transverse plane, represented by the section line 19—19 in Fig. 15, the spreader blades 1626 and 1628 begin to bow or curve outwardly slightly, as illustrated in Fig. 19, and are thereafter of constantly and gradually increasing curvature in a vertical plane, as seen in Figs. 21 and 23, until the transverse plane 23—23 is reached, after which the spreader blades are of rapidly decreasing curvature, as seen in Fig. 25. Between the vertical planes, indicated by lines 23—23 to 25—25 in Fig. 15, the blades 1626-1628 and the blades 1622-1624 diverge in a horizontal plane at a uniform increment so as to effect a uniform horizontal spreading of the peach halves end of the cups in which the peach halves are carried. The forward end of the doubly-divergent, convex portions of the spreader blades merges gradually into the forward end portions of the spreader blades, as shown in Fig. 14. The rear end portions of the spreader blades 1622 and 1624 are provided with horizontal wires 1644 to prevent the peach halves from turning in the cup sections as they approach the spread-apart position which they will occupy during the pitting operation.

Applicant has found that movable spreader blades or wings restrict or limit the capacity of a continuously moving pitting machine and a smoother action in spreading the fruit and the carrying cups is necessary as the speed and hence the capacity of the machine are increased. It is difficult to illustrate the exact relative positions of the peach halves as the fruit is moved along the spreader blades, as these positions will vary somewhat depending upon the size of the peach. In the illustrative diagrams of Figs. 17 to 27, the relative positions of the half peaches in the cups are represented for an average size peach of approximately 3" in diameter.

During the time the peach halves travel over the spreader blades, the peach halves are pressed toward and into contact with the spreader blades by the spring 1452 which urges the cup sections toward each other.

In Figs. 17, 19, 21, 23 and 25, the peach halves are illustrated as though they were traveling on a horizontally straight surface rather than on surfaces of continually increasing divergence in a horizontal plane. These views, however, serve to show that as the peach travels along the horizontal path, each half peach turns in its cup on a horizontal axis. Thus, it will be noted that as each half peach passes over its spreader blade surface, the distance between the edges 1362b of the cup section 1362 and the spreader blades 1626 and 1622 decreases while the distance between the lower edge 1362c of the cup section and those spreader blades increases. Similarly, as shown in Figs. 17, 19, 21 and 23, as the opposite peach half travels horizontally along the spreader blades, the distance between the upper cup edge 1364b and the spreader blades 1628 and 1624 decreases while the distance between the spreader blades and the lower edge 1634c of this cup section increases. These distances decrease and increase respectively until the peach has reached the position shown in Fig. 25, after which the turning of the peach halves in the cup sections is prevented by the wires 1644.

Figs. 18, 20, 22, 24 and 26 are plan views looking down upon the peach half in the cup section 1364. From these views it will be noted that the distance between the leading edge A of the peach half and the leading edge 1364d of the cup section 1364 decreases while the distance between the trailing edge B of the peach half and the trailing cup edge 1364e of the cup section 1364 increases as the peach half moves along the spreader plates 1628 and 1624. It will be understood that the peach half in the cup section 1362 similarly moves in that cup section as exemplified in Figs. 20, 22, 24 and 26. Thus, as shown in these figures, the peach halves also turn in the cups on vertical axes. Experience in the use of the machine clearly demonstrated that notwithstanding this turning of the peach halves in the cups about both horizontal and vertical axes, the long axis of the pit is not moved out of its predetermined position or orientation with respect to the longitudinal axis of the machine. The theory why this maintenance of orientation takes place is not clearly understood. However, it is believed that the engagement of the hard flat surface of each half peach with the crown of the curve of each spreader blade, at points 1626c, 1628c, 1622c, and 1624c enables these crown points of the curve of the spreader blades to act as fulcrum points for the turning of the peach halves about horizontal axes, which fulcrum points lie in the long axes of the pits so that the long axes of the pits in effect serve as the horizontal axes of turning of the peach halves occasioned by the vertical divergence of the spreader blades. As each half peach moves along the spreader blades, the flesh of each peach half slightly folds itself around the long curve of the spreader blades, thereby keeping the long axis of each pit in proper position of orientation longitudinally of the machine even though the peach is turned about vertical and horizontal axes relative to the cup sections.

In Fig. 17 the half peaches are shown as traveling across the surface of the spreader blades in advance of the curved portions thereof, at which time the peach halves have just been released from the effects of the added pressure of the spring 1519 (Figure 5), and therefore do not start to turn in the cup sections until the exposed surfaces of the half pits engage the crown points of the convex surfaces of the spreader blades.

As the peach halves approach the position shown in Figs. 25 and 26, the roller 1414 for actuating the cup sections reaches the inclined end 1492 of the cam track 1490 and the cup sections begin to swing outwardly under the action of the cam track. Between that position and the position shown in Fig. 27, the peach halves continue to move along surfaces of the diverging spreader blades which are substantially flat in vertical section and the wires 1644 prevent turning of the peach halves in the cup sections while the continuing divergence of the spreader blades causes the peach halves to move outwardly or to be spread with the outwardly spreading cup sections so that the peaches remain fully seated in the cup sections until said sections have been spread apart sufficiently for the peach halves to remain seated in the cup sections by the action of gravity. The wires 1644 also establish restricted areas or zones of sliding contact between the spreader blades and peach halves so as to overcome the tendency of the peach halves to stick to surfaces in which they are in face to face contact.

The cut away leading edges 1371 of the cup sections, as illustrated in Fig. 16, permit smaller peaches to be firmly held against the spreader blades. Applicant found that with the smaller peaches the cup sections, unless relieved along the leading edges, as shown in Fig. 16, would so confine or grip the peaches that could not turn relative to the cup sections while moving along the spreader blades, and the orientation thereof was, at times, adversely affected by the spreader blades. Thus, at times, the smaller peaches would not be properly presented to the pitting mechanism and the pit cavities formed in the peach halves would be out of line with the stem blossom axis of the half peaches. Applicant found that the relieving of the leading edges of the peach cups cured the difficulty by enabling the smaller peaches to be held firmly against the spreader blades.

The pitting or deseeding mechanism

The pitting, deseeding or coring mechanism 1290, Fig. 1, comprises a traveling frame 1770, best shown in Figs. 33 and 38. As there shown, the frame 1770 comprises longitudinal bar portions or arms 1772 and 1774 joined adjacent their forward ends by an integral cross bar 1776. The frame 1770 is pivotally mounted, by studs 1778 and 1779, on the upper ends of parallel links 1780, 1782, 1784, and 1786, Figs. 1, 3, 4, 35 and 38. The parallel links 1780 to 1786 inclusive are journaled on parallel cross shafts 1788 and 1790, Figs. 1 and 3, journaled in suitable bosses provided in brackets such as 1792, Fig. 1, bolted to side frame plates 2 and 4.

The pitter headframe 1770 is moved "forwardly" with respect to the moving fruit cups (but rearwardly of the machine) from the "rearward" position shown in dotted lines in Fig. 1 to the "forward" position shown in full lines in said figure, by a stud 1794, Fig. 4, on which is journaled a cam roller 1796 (Fig. 28) received in an internal cam track 1797 of a cam 1798 secured to the end of the shaft 1358.

The pitter headframe carries a pair of knife mechanisms 1806 and 1808, Fig. 36; a pair of pitter pad and knock-out assemblies 1810 and 1812, Figs. 32 and 36, and a pair of pitter knife operating mechanisms 1814 and 1816, Fig. 35.

The pitter knife mechanisms 1806 and 1808 comprise four curved pitter blades or scoops 1818, 1820, 1822 and 1824 mounted in pairs, the pitter blades 1818 and 1820 being bolted to bars 1826 and 1828 while the blades 1822 and 1824 are bolted to bars 1830 and 1832. The bars 1826 and 1828, Fig. 32, are formed with depending, right angle end portions forming bosses 1834 at one end and bosses 1836 and 1837 at the other end. The boss 1836 is pinned or otherwise secured to a shaft 1838 and the boss 1837 is pinned or otherwise secured to a sleeve 1840, the shaft 1838 being journaled in the sleeve 1840 and the sleeve 1840 being journaled in a boss 1842 formed in a bracket 1844, best shown in Fig. 34. The bracket 1844 has a generally triangular vertical portion 1846; a horizontal plate portion or shelf 1848, and bosses 1842 and 1850 formed integrally with the plate portion 1846 and at the base corners thereof.

The shelf 1848 rests upon the cross bar 1776 of the pitter head frame 1770 and is secured thereto as by bolts 1852, Figs. 35 and 38, received in slots 1854, Fig. 34, in the shelf 1848 and threaded into the cross bar 1776. Slots 1854 permit ready adjustment of the bracket 1844 laterally of the pitter head frame 1770 so that the pitter knife mechanisms 1806 and 1808 and the pitter pad assemblies 1810 and 1812 may, by adjustment laterally of the conveyor, be properly aligned with respect to the fruit cups. The pitter knife mounting bars 1830 and 1832 of the pitter knife mechanism 1808 are identical to the pitter knife mounting bars 1826 and 1828 of the pitter knife mechanism 1808 and are provided at one end with a boss (not shown) similar to the boss 1836 and a boss 1857, Fig. 37, similar to the boss 1837, these bosses being secured to a shaft 1858 and a sleeve 1860. Bars 1830 and 1832 are formed at their opposite ends with bosses, not shown, but similar to the bosses 1834 of bars 1826 and 1828. The bosses 1834 of the knife mounting bars 1826 and 1828 are journaled on a stud 1861, Fig. 32, bolted to the depending flange or leg 1862 of a mounting bracket 1863 having a horizontal plate portion 1864 extending over those knife mounting bars. The bracket 1863 is formed at its other end with an upstanding flange 1866 bolted to the vertical plate portion 1846 of the bracket 1844. The knife mounting bars 1830 and 1832 are similarly journaled on a stud 1870, Fig. 36, bolted to the depending rear leg of a bracket 1873 identical to the bracket 1863 and having a plate portion 1874 extending over the knife mounting bars 1830 and 1843. The bracket 1873 is also formed with an upstanding front end flange similar to the flange 1866 of the bracket 1863 and similarly bolted to the vertical plate portion 1846 of the common bracket 1844. As clearly seen in Fig. 36, the brackets 1863 and 1873 are so mounted that the plate portions 1864 and 1874 are inclined to the vertical at equal, opposite angles and are symmetrically disposed with respect to the central vertical plane of the machine.

The pitter pad assemblies 1810 and 1812 comprise main hold-down pads or plates 1878 and 1880 respectively, contacting the exposed surfaces of the fruit halves when the fruit halves are properly positioned by the fruit cups. These main pads are centrally apertured, as at 1882 and 1884, to expose the pit or seed containing section of the fruit halves and permit passage of the pitting or deseeding knives into engagement with the exposed faces of the fruit halves and to pass around the pit or seed containing sections of the fruit halves. The main pad or plate 1880 is adjustably mounted by bolts 1886, Fig. 32, on the plate portion 1864 of the bracket 1863. The main pad 1878 is similarly, adjustably mounted by bolts, not shown, on the plate portion 1874 of the bracket 1873. The pitter pads may therefore be adjusted, by adjustment of the aforementioned bolts, toward and from the fruit holding cups so that the pitting mechanism, by change in the pitter blades, may be made to accommodate different grade-sizes of fruit halves. This adjustment also permits raising or lowering of the pads 1878 and 1880 so that the blades can be set to cut deeper or shallower depending on the size of pit.

The pad assemblies also comprise knock-out pads 1890 and 1892 positioned at the centers of the apertures 1882 and 1884 of the main pitting pads. The knock-out pads are threaded on plunger rods 1894 and 1896 to which are secured collars 1898 and 1900 slidably mounted in tubes 1902 and 1904 threaded into the plate portions 1864 and 1874 of the brackets 1863 and 1873. The plungers 1894 and 1896 are also slidably mounted in apertured plugs 1906 and 1908 threaded into and closing the upper ends of the tubes 1902 and 1904. Coil springs 1910 and 1912 are interposed between the collars 1898 and 1900 and the plugs 1906 and 1908 and therefore normally urge knock-out pads 1890 and 1892 downward so that their lower surfaces are normally disposed below the planes of the lower surfaces of the main pads 1878 and 1880. The springs of the knock-out pad assemblies readily yield as the fruit halves are brought by the raising of the cups into engagement with the main pads so that the knock-out pads are moved upwardly to have their lower surfaces in the planes of the lower surfaces of the main pads when the fruit halves are brought into engagement with the main pads, as shown in Fig. 36. These knock-out pad assemblies apply, through the pits or seed sections of the fruit halves, compressive forces on the flesh of the fruit halves in the paths of the pitting knives so that the pitting halves may make a clean cut about the pits or seed containing sections. On dropping of the cups away from the main pitter pads, after the pitting has been accomplished, springs 1910 and 1912 push the knock-out pads out or downwardly to free the fruit halves from the main pads should they tend to stick thereto.

The pitter knife operating mechanisms 1814 and 1816, Fig. 35, comprise gear segments 1914—1916 and 1918—1920, respectively. The gear segments 1914 and 1918 are pinned to the shafts 1838 and 1858 and the gear segments 1916 and 1920 are pinned to the sleeves 1840 and 1860. The central portion of the segmental gear 1918 is offset from the toothed rim thereof, as shown in Fig. 37, so as to interfit with the segmental gear 1920 and permit the teeth of the segmental gears 1918 and 1920 to lie in the same plane transverse to the axis of the shaft 1858 and sleeve 1860. The segmental gears 1914 and 1916 are similarly interfitted so that the teeth thereof lie in the same plane transverse to the axis of the shaft 1838 and the sleeve 1840.

The segmental gears 1914, 1916, 1918 and 1920 intermesh with rack bars 1922, 1924, 1926 and 1928 respectively, the rack bars 1926 and 1928 being bolted, as shown in Fig. 37, to a cross head 1930 and the rack bars 1922 and 1924 being similarly bolted to a cross head 1932. The cross head 1932 is bolted at its upper end to a rack bar 1934, Fig. 32, slidably mounted in guides formed by the front face of the upstanding arm of a bracket 1938 and side bars 1940, Fig. 35, bolted to the upstanding arm of the bracket 1938. The bracket 1938 is provided with an inturned foot portion or flange 1942 secured to the shelf 1848 as by bolts 1944. The cross head 1930 is similarly bolted at its upper end to rack bar 1936, Fig. 35, slidably mounted in guides formed by the front face of the upstanding arm of a bracket 1939 similar to the bracket 1938 and between the side guide bars 1946, the bracket 1939 being mounted on the shelf 1848 of the bracket 1844 in the same manner as is the bracket 1938.

The cross heads are raised by spring action, following a pitting operation, to return the pitting knives to open position. For that purpose the cross heads 1930 and 1932 are provided with threaded rods 1954 and 1956 threaded into lateral lugs, as 1958 and 1959, of the cross heads. These rods are slidably mounted in the shelf portions of brackets 1960 and 1962 which are bolted to the brackets 1938 and 1939 and are provided with suitable slots permitting passage of the rack bars 1934 and 1936. The rods 1954 and 1956 are encircled, above the shelves of the brackets 1960 and 1962, by coil springs 1964 and 1966 which bear at their lower ends on the shelves of the brackets 1960 and 1962 and at their upper ends on washers underlying nuts 1968 and 1969 threaded on the upper ends of the rods. The cross heads 1930 and 1932 are moved downwardly against the action of the springs 1964 and 1966, by segmental gears 1970 and 1972, Figs. 31 and 34, meshing with the rack bars 1934 and 1936, as illustrated in Fig. 32. The segmental gears 1970 and 1972 are fastened to shafts 1974 and 1976 respectively (Figs. 31 and 35), which are journaled in bosses formed at the upper ends of the brackets 1938 and 1939 and are axially aligned. The shaft 1974 is adjustably connected to the shaft 1976 by means of a lever 1978 fastened to the shaft 1974 and a lever 1980 fastened to the shaft 1976. Lever 1980 is preferably formed with a split boss 1982 clamped to the shaft 1976 by the bolt 1984. The lever 1980 is formed with an arcuate slot 1986 receiving a clamping bolt 1988 threaded into an aperture 1990 in the lever 1978. A set screw 1992 received in a threaded aperture extending through the side of the lever 1980 communicating with the slot 1986, provides means for adjusting clamping bolt 1988 arcuately of the lever 1980 and hence serves to adjust the lever 1978 relative to the lever 1980. The set screw 1992 is held in adjusted position as by clamping nut 1994.

The shaft 1976 is also journaled in a boss 1996 of a bracket 1998 bolted to and upstanding from a generally triangular supporting plate 2000 secured to the pitter head frame 1770, as by the bolts 1779 which pivotally connect the frame carrying links 1784 and 1786 to the pitter head frame, as shown in Fig. 38.

A cam 2002, Figs. 4 and 28, secured to the shaft 1358 adjacent the pitter head actuating cam 1798 operates a pitter knife actuating lever 2004. The lever 2004 is pivoted intermediate its ends on a stud 2006 supported by brackets 2008 and 2010 bolted to the side frame plate 4. The lever 2004 carries at its lower end a stud on which is journaled a cam roller 2012, the lever being urged in a counterclockwise direction, as seen in Fig. 28, so as to maintain the cam roller 2012 in engagement with the cam 2002 by coil spring 2014 encircling a rod 2016 pivoted at one end to the lever 2004 and slidably mounted in an outwardly extending arm of a bracket 2018 bolted to the side frame plate 4. The spring 2014 bears at one end against the bracket 2018 and at the other end against an annular shoulder 2020 formed on the rod 2014. The lever 2004 is connected to and actuates the shaft 1976, and through it the shaft 1974, by an internally threaded coupling 2022 pivoted to the upper end of the lever 2004; a coupling 2024 adjustably connected as hereinafter described to the shaft 1976 and a threaded adjusting rod 2026 threaded into the couplings 2022 and 2024 and held in adjusted position by the clamping nuts 2028 and 2030.

The coupling 2024 is adjustably connected to the shaft 1976 by means of a lever 2032 journaled on the shaft 1976 and a lever 2034 preferably formed with a split boss 2036 clamped to the shaft 1976 as by bolt 2038. A pivot bushing 2040 inserted in the boss of the coupling 2024 is journaled on a mounting bolt 2042, Fig. 35, received in a longitudinally inclined slot 2044 in the lever 2032. The bushing 2040 is of a length slightly greater than the width of the boss portion of the coupling 2024 and a washer 2046 on bolt 2042 retains the coupling on the bushing but permits the coupling and bushing to rotate relatively. A nut 2048 on the other end of the bolt clamps the bolt and bushing in adjusted position in the slot 2044 of the lever 2032. A set screw 2050 threaded into the lower end of the lever and projecting into the slot 2044 provides means for adjusting the bolt 2042 longitudinally of the slot to vary the angle of throw of the lever 2032 and thereby vary the angle of swing of the pitting blades actuated by the shafts 1974 and 1976. The usual clamping nut 2052 retains the set screw 2050 in adjusted position. The lever 2034 is formed with an arcuate slot 2054 receiving a bolt 2056 threaded in an aperture 2058 in the lever 2032. A set screw 2060 threaded into an aperture in the edge of the lever projects into the slot 2054 so as to adjust the bolt 2056 relative to the lever 2034.

It should be noted, as shown in Fig. 29, the slot 2044 in the lever 2032 is in vertical position when the pitting blades are closed around the pit. Consequently, adjustment of the stud bolt 2042 up or down in the slot does not change the position of the blades when closed under the pit but allows the blades to open to a greater or lesser extent depending on the direction of adjustment of the stud bolts in the slot. On loosening of the bolts 1988 and 2056 the set screws 1992 and 2060 may be adjusted to cause the pitting blade units 1806 and 1808 to operate together, that is, to cause the blades of the two units to close the same amount and to open the same amount.

It should be noted that the cup closing spring 1452 supplies a compressive force urging the cut surfaces of the fruit halves into engagement with the apertured plates 1878 and 1880 of the pad assemblies 1810 and 1812. Auxiliary means 2062, Fig. 1, provides additional or auxiliary compressive forces urging the cut faces of the fruit halves into engagement with the apertured pitting pads during the swinging of the pitting knives about the half pits. This means 2062 comprises, as best shown in Figs. 1, 35, 36 and 38, brackets 2064 and 2066 bolted to the longitudinal arms 1772 and 1774 of the pitter head frame 1770. Each of these brackets is formed with integral spaced depending arms 2068 terminating at their lower ends in bosses 2070. A shaft 2072 is journaled in the bosses 2070 of the bracket 2064 and a shaft 2074 is journaled in the bosses of the bracket 2066. A lever 2076 is fastened to the inner end of the shaft 2072 while a like lever 2078 is fastened to the inner end of the shaft 2074, these levers carrying at their free ends rollers 2080 and 2082 respectively for engaging and pressing the cup sections 1362 and 1364 upwardly and toward the apertured pitting pads 1880 and 1878, as illustrated in Figs. 35 and 36, when the shafts 2072 and 2074 are actuated. The shaft 2072 is actuated by means of a yoke 2084 having at one end a boss 2086 fastened to the shaft 2072 while its other end is connected by a universal joint 2088 to a vertical actuating rod 2090. The shaft 2074 is connected with the actuating yoke 2084 for simultaneous actuation of the shaft 2072 by means of a lever 2092 pinned to the forward end of the shaft 2074 and connected by a pitman or rod 2094 to a lever 2096 which may be formed integrally with the actuating yoke 2084, the rod 2094 being pivoted at its opposite ends to the levers 2092 and 2096. The vertical actuating rod 2090 is slidably received relatively adjacent its lower end in a block 2098 pivoted on an axis transverse to the rod. The pivot studs for the block 2098 are received in suitable apertures in the outer end of a lever 2100 and in a block 2102 riveted or bolted to the lever 2100. A coil spring 2104 is interposed between a collar 2106 bearing against the under surface of the block 2098 and a nut 2108, Fig. 1, threaded on the lower end of the actuating rod 2090. The lever 2100 is pivotally mounted on a headed stud or bolt 2110 secured to the side frame plate 2 and carries a cam roller 2112 operated by an actuating cam 2114 fastened to a shaft 2116 journaled in a suitable bracket, not shown, secured to the side frame plate 2. The shaft 2116 is provided with a drive gear 2118 to mesh with the chain conveyor drive gear 1356. The cam roller 2112 is maintained in engagement with the cam 2114 by a coil spring 2120 mounted on a rod 2122 slidably mounted in the laterally extending shelf of a bracket 2124 fastened to the side frame plate 2. The coil spring 2120 is interposed between a spring retainer carried by the shelf of the bracket 2124 and a nut and washer 2126 secured to the upper portion of the rod 2122, the rod being secured at its upper end to a yoke 2128 pivotally secured to the lever 2100. The coil spring 2120 serves not only to maintain the roller 2112 in engagement with the cam 2114 but also, being normally stronger than the spring 2104, serves normally to maintain the rod 2090 in elevated position so that the rollers 2080 and 2082 are out of the path of the traveling pitter cups. The spring 2120 acts upon the rod 2090 through the lever 2100 and a collar 2130 adjustably fastened to the rod 2090. When the cam 2114 depresses the roller 2112, and thereby depresses the lever 2100, the spring 2120 is rendered ineffective to urge the rod 2090 upwardly and the spring 2104 is compressed thereby urging the rod 2090 downwardly and thereby rotating the shaft 2072 in a counterclockwise direction, as seen in Fig. 38, while rotating the shaft 2074 in a clockwise direction, as seen in the same figure, so that the rollers 2080 and 2082 engage the cup sections 1362 and 1364 and thereby apply the additional compressive force of the spring 2104 to the fruit halves thus urging the cut surfaces of the fruit into still firmer engagement with the apertured pitting plates 1878 and 1880.

*Operation of the machine*

The combined motor and speed reducer 29 continuously drives the conveyor 30, as previously described, by continuously rotating the shaft 31 in a clockwise direction, as seen in Fig. 1, to cause the upper flights of the conveyor chains 22a and 22b to pass from the sprockets 42' and 43' (Figs. 1, 5, 6 and 7) to the sprockets 35 and 37 (Fig. 3).

Peaches are oriented as to suture plane and fed into the cup units 1360 of the conveyor 30, as described in my Patent No. 2,788,818 aforesaid, with the suture plane of the peach coincident with the plane of the saw.

As a cup unit 1360 approaches the forward end of the second conveyor the cup actuating roller 1414 of that unit engages the cam track 1484, thereby opening the cup unit which therefore remains in open position until the roller 1414 reaches the cam surface 1486, Figs. 5 and 7. As the cam roller 1414 passes over the cam surface 1486 the cup unit 1360 is closed by the action of its spring 1452 so as to engage and grip the peach at the instant that the transfer mechanism described in said Patent No. 2,788,-818 deposits the peach therein.

The cup unit 1360, having grasped the peach in its suture plane coincident with the central longitudinal plane of the machine, carries the fruit then past the rotating saw which splits the flesh and pit of the fruit along the suture, the saw being positioned in the central vertical plane of the machine. The cup unit then carries the fruit halves over the doubly divergent and curved stationary spreader blades 1620 to 1628, as previously described, to spread apart the fruit halves and the cup sections in which the fruit halves are contained, all as shown in Figs. 17 to 27, the fruit halves turning in and relative to the cup sections about a vertical axis and about a horizontal axis substantially about the point of contact of the hard pit with the crown of the vertically curved portion of the spreader blades. The wires 1644, Figs. 15 and 25, preclude further turning of the fruit halves as the fruit is carried past the rear portion of the spreader blades 1622 and 1624 and serve to break the suction between the sticky cut surfaces of the flesh of the fruit halves and the surfaces of the spreader blades. As the fruit halves pass along the wires 1644, the actuating roller 1414 moves into engagement with the inclined track section 1492 and the cup sections are swung to open position, as shown in Fig. 27, so as to pass beneath the traveling pitter frame 1770 and below the pitter pad assemblies 1810 and 1812. The pitter headframe, mounted on the pivoted links 1780 and 1784, in moving "forwardly" at the same rate as the continuously moving half fruit cups 1362 and 1364, traverse an arc of movement, of which the highest point is at the end of the forward movement of the pitter headframe. By the time the roller 1414 of the fruit cup unit 1360 reaches the entering end of the notch 1484 in the cam track 1490, the half peaches are vertically aligned with the pitting pad assemblies and the cup closing spring 1452 swings the half fruit cups upwardly to bring the cut surfaces of the fruit halves into engagement with the apertures of the fruit engaging pads 1878 and 1880, as shown in Fig. 36, which, if the halves be tilted in the cups, re-center them with the cup walls. During the movement of the actuating roller 1414 through the notch in the cam track, the cam 2114, Fig. 38, causes rotation of the shafts 2072 and 2074 in such direction as to bring the rollers 2080 and 2082 into engagement with the cup sections 1362 and 1364 and thereby apply the additional spring pressure, provided by spring 2104, to the fruit cups and therethrough to the fruit halves thereby to increase the compressive forces urging the flesh of the fruit against the apertured pitting pads 1878 and 1880. While the fruit halves are thus firmly pressed against the apertured pitting plates, cam 2002 actuates the shafts 1974 and 1976 so that the gear segments 1970 and 1972 are rotated in a clockwise direction, as seen in Figs. 31 and 32, thereby to raise the crossheads 1930 and 1932 and to cause opposite swinging movement of the blades of each pitting mechanism so as to cut around the pit and meet beneath the pit, all as heretofore described. The knock out pads 1890 and 1892 engage the pit halves, as shown in Fig. 36, and by the pressure exerted on the pits, urge the pits toward the path of movement of the pitting knives, and so compress the flesh of the fruit about the pit that a minimum pitting cut is made by the pitting knives, and a clean uniform nonjagged cut made by the knives through the flesh of the fruit about the pit.

The pitting knives having completed their movement, the cup actuator roller 1414 reaches the section 1502 of the cam track 1490 thereby again swinging the cup sections outwardly to open position and away from pitting pad assemblies, while the cam 2114 actuates the lever 2100 to swing the rollers 2080 and 2082 out of the path of the cup units as they move downwardly, and the cam 2002 causes the pitting blades to swing from closed position to open position. As the pitting blades move to open position the springs 1910 and 1912 force the knock out pads 1890 and 1892 outwardly, thereby ejecting the half pits from between the pitting blades. The fruit cup units 1360 continue their movement toward the rear of the machine, while the cam 1798 causes the pitter headframe 1770 to reverse its direction of movement and return to its starting position in time to meet and again move forwardly with the next oncoming cup unit. As the cup unit carries the simultaneously pitted fruit halves past the rear end of the second conveyor, the fruit cups being in open position, the pitted fruit halves are discharged by gravity from the cups onto a suitable receptacle or into a suitable conveyor or belt by which they are carried to suitable packing mechanisms or further peach processing mechanisms. As the cup units 1360 pass about the end of the conveyor, they are swung to closed position depending vertically from the lower flight of the conveyor and in this closed position they remain until they again arrive at the point where the cup actuating roller 1414 engages cam track 1484, as previously described, and are swung to open position for the receiving of a peach.

It is apparent that many widely different embodiments of this invention may be made without departing from the spirit and scope thereof, and therefore it is not intended to be limited except as indicated in the appended claims.

The invention is hereby claimed as follows:

1. In a machine of the character described, a continuously moving conveyor, a succession of spaced fruit holders on said conveyor, each holder being mounted on said conveyor for successive swinging upwardly away from and then downwardly toward said conveyor during a predetermined portion of the path of travel of said conveyor, pitting mechanism, means for supporting said pitting mechanism at an angle of inclination over said conveyor, means for moving said supporting means with said pitting mechanism forwardly and backwardly over said conveyor, means for moving said pitting mechanism relative to its supporting means when a fruit holder positions a fruit adjacent to said supporting means, means for automatically swinging said fruit holders in succession upwardly to position a fruit in the holder adjacent the pitting supporting means and downwardly from said supporting means on completion of the pitting operation, and means mounted for movement from a position out of the path of the fruit holder to a position in engagement with the fruit holder when the fruit is positioned adjacent to pitting supporting means for resiliently maintaining the holder in said position.

2. A fruit pitting machine comprising a conveyor, means for advancing the conveyor at a predetermined constant rate, a fruit holder mounted on said conveyor for swinging movement about an axis fixed relative to the conveyor, a pitter support movable forwardly and backwardly along a path spaced from but extending longitudinally of the path of travel of said conveyor, pitting mechanism mounted on said pitting support, resilient means for swinging said fruit holder containing a half fruit with its cut face outermost toward said pitter support while the pitter support is moving in the direction of travel of the conveyor, said pitting mechanism including an apertured plate inclined at an angle substantially parallel to a radius through said axis to engage the cut face of a half fruit on swinging of the holder toward said support by said resilient means, means carried by the pitter support for pitting the half fruit through the aperture in the plate when the cut face of the fruit is resiliently pressed into engagement with the plate and moving at the same speed as the pitter support, and auxiliary pressure means movable from a position out of the path of the fruit holders into engagement therewith to increase the pressure of the engagement between the cut face of the fruit and the apertured plate during the pitting of the half fruit.

3. In a fruit pitting machine, a conveyor movable continuously at a substantially uniform rate, a pitter support movable forwardly and backwardly over said conveyor, a pair of half fruit holders mounted on said conveyor for swinging movement upwardly and downwardly about a common axis, a pair of pitter members mounted on said support and inclined at opposite angles, said members having openings therein to expose the pits in the fruit halves when the holders are swung upwardly to bring the cut faces of the half fruit in said holders into engagement with said members, pitter blades mounted on said conveyor for movement relative thereto through the openings in said members to pit the fruit halves in the holders when the cut faces of the half fruit contact said members, means for moving said support in synchronism with the conveyor while the cut faces of the half fruits engage said members, means for operating said pitter blades including operating members carried by said support and actuating means in the path of movement of said operating members to engage and actuate said operating members during the synchronous movement of the support and the conveyor, and spring pressed means including a pair of members normally positioned out of the path of the half fruit holders and mounted for movement into engagement with said half fruit holders for causing the cut faces of the half fruit to contact said pitter members under pressure.

4. In a device of the class described, the combination of a conveyor arranged for movement, a portion of which is in a predetermined path disposed in a single plane, means on said conveyor for supporting a series of spaced apart half fruits each with its cut face uppermost and for movement relatively to said conveyor, a pitter head operatively positioned relatively to that portion of path of travel of the conveyor which lies in said single plane, means for mounting said pitter head for reciprocable, linear movement adjacent to and spaced from at least a portion of said horizontal path of travel of the said conveyor, means for also moving said pitter head toward and from said single plane of movement of said conveyor and as said pitter head moves along its own path of travel, means for linearly advancing the pitter head along an adjacently spaced path of travel to cause it to move at the same speed as the half fruits during said movement of said pitter head along said elongated path of travel and when said pitter head is moving in the same direction as the half fruits during their path of travel with the conveyor, means operative during a portion of said advancing movement of said pitter head for shifting a fruit supporting means out of the path of travel of the conveyor to position the cut face of a half fruit into contact with a portion of the moving pitter head whereby to cause the same to move together in contact and at the same speed for a predetermined length of time, means operative during said predetermined length of time for actuating the pitting mechanism relatively to said pitter head and into contact with and through the cut face of the half fruit for pitting the half fruit, and pressure means adapted to engage a fruit, supporting means when shifted from a position out of the path of the traveling conveyor to apply pressure between the cut face of the half fruit and the moving portion of the fruit pitting mechanism in contact with the fruit during the pitting operation.

5. In a device of the class described, the combination of conveyor means, means for continuously moving the conveyor means over a predetermined path of travel, spaced fruit holding means shiftably mounted on the conveyor for movement laterally of said conveyor, each fruit holding means being arranged to hold a half fruit with its cut face outermost, pitter supporting means spaced from and disposed along the path of travel of said conveyor, means to move a fruit holder toward said pitter supporting means to position the cut face of the half fruit carried by said fruit holder adjacent the pitter supporting means, means operable while said half fruit is so positioned for actuating the pitting mechanism to pit the half fruit without interrupting the advance of said conveyor means, pressure means including a member carried by the pitter supporting means and means for moving said member into engagement with said fruit holder to maintain the fruit carried by the fruit holder adjacent the pitter support during the pitting operation.

6. In a device of the class described, the combination of a conveyor having a succession of spaced apart fruit cups laterally movable thereon and relatively thereto, means for moving said conveyor along a predetermined elongated path at a substantially constant speed, a parallelogram of levers pivotally mounted adjacent the path of movement of the fruit carriers, a pitter head pivotally mounted at the upper ends of said levers for arcuate movement longitudinally of the path of travel of the fruit cups, means contacting at least one of said levers for arcuately reciprocating said pitter head, pitting mechanism mounted on said pitter head and including fruit contacting means relatively to which the pitting mechanism is operable, means operated in timed relation with the reciprocation of said pitter head as it moves arcuately adjacent the general direction of the advancing movement of the conveyor for resiliently shifting a fruit cup relative to the conveyor to position the cut face of the half fruit in contacting relation with the fruit contacting means of the pitter head, means operable while the half fruit is in contact with the fruit contacting means for actuating the pitting means to pit the half fruit, and auxiliary pressure means movable from a position out of the path of the fruit holder into engagement with the fruit holder for increasing the pressure of contact of the cut face of the half fruit with the fruit contacting means during the pitting operation.

7. A fruit pitter comprising a support, a fruit engaging plate carried by said support and having an aperture therein to expose the pit containing section of a half fruit to be pitted, a half fruit holder shiftably mounted to position the half fruit therein in engagement with said plate with its pit containing section exposed by said aperture, fruit pitting knife mechanism shiftably carried by said support for movement about the pit containing section of the half fruit, means for shifting said holder and actuating said knife mechanism in timed relation to pit a half fruit when positioned in engagement with said plate, and spring actuated cam control means movable into engagement with said holder and operatively interconnected with said actuating means to compress the half fruit against the fruit engaging plate during the pitting operation.

8. In a fruit pitter as set forth in claim 7 wherein the fruit holder is carried by a conveyor to which it is shiftably connected and means is provided for reciprocating said pitter support in timed relation to the movement of the conveyor.

9. In a fruit pitter as set forth in claim 7 wherein the spring actuated cam control means includes a rotary driving cam, a spring controlled lever having a cam following roller engaging said rotary cam, an actuating rod, a compressible spring interconnecting said rod and said lever for moving said rod in one direction upon actuation of said lever by said cam and an abutment on said rod engageable by said lever for moving said rod in the opposite direction under action of the lever controlling spring.

10. In a fruit pitting machine, a pitter, a conveyor, driven at a continuous uniform rate, a traveling pitter support mounted for movement forwardly and backwardly along a path spaced from but extending longitudinally of a portion of the path of travel of said conveyor, a succession of spaced half fruit holders on said conveyor, means mounting said holders on said conveyor for successive movement laterally of the path of travel of the conveyor to position the half fruits for engagement by the pitter, means for moving said pitter support with said pitter along said longitudinally extending path, fruit pressing means adapted to engage each fruit holder for resiliently pressing the fruit in the holder against the traveling pitter, means actuated in timed relation to the conveyor for moving said fruit pressing means into engagement with successive fruit holders when positioned for engagement of the fruit therein by the pitter, and means for actuating said pitter in timed relation to the conveyor and said fruit pressing moving means for pitting each half fruit while pressed against said pitter.

11. In a fruit pitting machine, a conveyor, a succession of spaced fruit holders on said conveyor, means for mounting each holder on said conveyor for successive movement upwardly and away from and then downwardly and toward said conveyor during its movement along a predetermined portion of the path of travel of said conveyor, pitting mechanism, means for supporting said pitting mechanism for movement over said conveyor, means for moving said supporting means with said pitting mechanism forwardly and backwardly over said conveyor, means for moving said pitting mechanism relative to its supporting means to pit the fruit when a fruit holder positions a fruit for engagement by said pitting mechanism, means for automatically moving said fruit holders in succession upwardly during movement thereof along said predetermined portion of the path of travel of said conveyor to position a fruit in a holder for engagement by said pitting mechanism and downwardly from said supporting means on completion of the pitting operation, and means mounted for movement from a position out of the path of the fruit holder to a position in engagement with the fruit holder when the fruit is positioned for engagement by said pitting mechanism for resiliently pressing the fruit in the holder against the pitting mechanism.

References Cited in the file of this patent

UNITED STATES PATENTS

| | | |
|---|---|---|
| 2,420,659 | Ewald et al. | May 20, 1947 |
| 2,551,076 | Waters | May 1, 1951 |
| 2,622,002 | Kingsbury | Dec. 16, 1952 |
| 2,673,584 | Skog | Mar. 30, 1954 |